(12) United States Patent
Ye

(10) Patent No.: US 11,316,792 B2
(45) Date of Patent: Apr. 26, 2022

(54) METHOD AND SYSTEM OF LIMITING TRAFFIC

(71) Applicant: Wangsu Science & Technology Co., Ltd., Shanghai (CN)

(72) Inventor: Wenbo Ye, Shanghai (CN)

(73) Assignee: Wangsu Science & Technology Co., Ltd., Shanghai (CN)

(*) Notice: Subject to any disclaimer, the term of this patent is extended or adjusted under 35 U.S.C. 154(b) by 72 days.

(21) Appl. No.: 16/902,800

(22) Filed: Jun. 16, 2020

(65) Prior Publication Data

US 2020/0351207 A1     Nov. 5, 2020

Related U.S. Application Data

(63) Continuation of application No. PCT/CN2019/090339, filed on Jun. 6, 2019.

(30) Foreign Application Priority Data

Apr. 30, 2019   (CN) .......................... 201910364818.4

(51) Int. Cl.
  *H04L 47/20* (2022.01)
  *H04L 47/70* (2022.01)
  *H04L 47/78* (2022.01)

(52) U.S. Cl.
  CPC ............ *H04L 47/20* (2013.01); *H04L 47/781* (2013.01); *H04L 47/822* (2013.01); *H04L 47/826* (2013.01)

(58) Field of Classification Search
  CPC ..... H04L 47/20; H04L 47/826; H04L 47/781; H04L 47/822
  See application file for complete search history.

(56) References Cited

U.S. PATENT DOCUMENTS

| 7,412,245 B2 | 8/2008 | Guo |
| 2010/0329248 A1 | 12/2010 | Eggert et al. |

(Continued)

FOREIGN PATENT DOCUMENTS

| CN | 101702669 A | 5/2010 |
| CN | 103997522 A | 8/2014 |

(Continued)

OTHER PUBLICATIONS

International Search Report for the corresponding application PCT/CN2019/090339, dated Jan. 6, 2020, 4 pages.

(Continued)

*Primary Examiner* — Jung H Park
(74) *Attorney, Agent, or Firm* — Heslin Rothenberg Farley & Mesiti, PC

(57) ABSTRACT

The present disclosure provides a method and system of limiting traffic. The method includes: sending, by a distributed node, a service volume in a current preset time period to a central node according to a fixed period; determining, by the central node, a decision quota of the distributed node based on the received service volume, and sending the decision quota to the distributed node; receiving, by the distributed node, the decision quota sent by the central node; and determining, by the distributed node based on the latest received decision quota after receiving an access request, whether traffic limitation needs to be performed for the access request. The traffic limitation decision of the present application is made by the distributed node autonomously, the decision path is short, and fast and accurate decision making is achieved.

20 Claims, 2 Drawing Sheets

(56) References Cited

U.S. PATENT DOCUMENTS

| | | | | |
|---|---|---|---|---|
| 2015/0012656 A1* | 1/2015 | Phillips | ............... | H04L 41/509 709/226 |
| 2015/0029851 A1* | 1/2015 | Haydock | ............ | H04L 67/1008 370/235 |
| 2015/0249623 A1* | 9/2015 | Phillips | .................. | H04L 47/74 709/219 |
| 2015/0254734 A1* | 9/2015 | Scotto | ................ | H04L 12/1881 705/14.73 |

FOREIGN PATENT DOCUMENTS

| | | |
|---|---|---|
| CN | 104219319 A | 12/2014 |
| CN | 105450780 A | 3/2016 |
| CN | 106101183 A | 11/2016 |
| CN | 107204933 A | 9/2017 |
| CN | 107733972 A | 2/2018 |
| CN | 108366020 A | 8/2018 |
| CN | 108574965 A | 9/2018 |
| CN | 108848038 A | 11/2018 |
| WO | 2018206743 A1 | 11/2018 |

OTHER PUBLICATIONS

The Notice of Allowance and Search Report for the corresponding Chinese application CN201910364818.4, dated Mar. 2, 2021, 4 pages.

Extended European Search Report for the corresponding EP application EP19894390.4, dated Jan. 12, 2021, 15 pages.

The first office action and search report for the corresponding Chinese application CN201910364818.4, dated Jan. 6, 2020, 9 pages.

* cited by examiner

METHOD AND SYSTEM OF LIMITING TRAFFIC

CROSS-REFERENCE TO RELATED APPLICATIONS

The present disclosure is a continuation of international application No. PCT/CN2019/090339 filed on Jun. 6, 2019, and claims priority to Chinese Patent Application No. 201910364818.4, filed on Apr. 30, 2019 and entitled "METHOD AND SYSTEM OF LIMITING TRAFFIC", which are incorporated herein by reference in its entirety.

TECHNICAL FIELD

The present disclosure relates to the field of Internet traffic limiting technology, and in particular, to a method of limiting traffic and a system of limiting traffic.

BACKGROUND

With the rapid development of the Internet, the scale of computer systems is become larger, and distributed systems emerge accordingly. To ensure the system stability, the overall service volume of the distributed system is limited. Existing methods of limiting traffic include centralized traffic limiting and average/weight-based distribution. However, the two methods have their own disadvantages.

The centralized traffic limiting method is disadvantageous in that each traffic limiting decision of a distributed node requires interaction with a central node, resulting in a long decision path and slow decision making. Because the load of the distributed node changes all the time, and data at the time of decision implementation is different from the data at the time of decision making and delivery to the distributed node, the central node cannot make a decision according to real-time data, and is likely to make an incorrect decision, affecting the overall performance of the system.

For the average/weight-based distribution method, a fixed service volume is allocated to each distributed node. The decision making, though fast, is not accurate. Especially in the case of unbalanced load, some distributed nodes are overloaded, but the overall service volume of the system does not reach an upper limit.

SUMMARY

To resolve the problem of the prior art, embodiments of the present application provide a method of limiting traffic and a system of limiting traffic. The technical solutions are as follows.

According to a first aspect, a method of limiting traffic is provided, and the method includes:

sending, by a distributed node, a service volume in a current preset time period to a central node according to a fixed period;

determining, by the central node, a decision quota of the distributed node based on the received service volume, and sending the decision quota to the distributed node;

receiving, by the distributed node, the decision quota sent by the central node; and determining, by the distributed node based on the latest received decision quota after receiving an access request, whether traffic limitation needs to be performed for the access request.

Optionally, the service volume further includes a back-to-source volume; and correspondingly, the step of determining, by the distributed node based on the latest received decision quota after receiving an access request, whether traffic limitation needs to be performed for the access request includes:

after receiving the access request, determining, by the distributed node, whether a back-to-source request needs to be sent to a source station; and if yes, determining, based on the latest received decision quota, whether traffic limitation needs to be performed for the access request.

Optionally, the service volume in the preset time period includes at least one of traffic generated by the distributed node in the preset time period, an average bandwidth in the preset time period, the number of connections established in the preset time period, and the number of access requests in the preset time period.

Optionally, the step of determining, by the distributed node based on the latest received decision quota, whether traffic limitation needs to be performed for the access request includes:

comparing, by the distributed node, a current service increment with the latest received decision quota; and if the current service increment of the distributed node is less than the latest received decision quota, skipping performing traffic limitation, or otherwise, performing traffic limitation for the access request.

Optionally, after the determining, by the distributed node, that the current service increment is greater than or equal to the latest received decision quota, the method further includes:

determining a time interval between a current time and a time at which a service volume is sent to the central node last time;

if the time interval is less than a preset duration, performing traffic limitation for the access request; and if the time interval is greater than or equal to the preset duration, sending the service volume in the current preset time period to the central node, receiving a new decision quota sent by the central node, and then determining, based on the latest received decision quota, whether traffic limitation needs to be performed for the access request.

Optionally, the step of performing, by the distributed node, traffic limitation for the access request includes:

rejecting, by the distributed node, the access request; or limiting, by the distributed node, a response rate to the access request.

Optionally, after the determining, by the distributed node, that the current service increment is greater than or equal to the latest received decision quota, the method further includes:

responding, by the distributed node, to the access request at a preset response rate; and receiving, by the distributed node, a next access request, and rejecting the next access request if the current service increment is still greater than or equal to the latest received decision quota.

Optionally, after the responding, by the distributed node, to the access request with a preset response rate, the method further includes:

receiving, by the distributed node, the next access request, and if the current service increment is less than the latest received decision quota and a current average response rate is greater than the preset response rate, responding to the next access request at the preset response rate, wherein the current average response rate is equal to a ratio of traffic generated in the current preset time period to the number of access requests in the current preset time period; and receiving, by the distributed node, the next access request, and if the current service increment is less than the latest received decision quota and the current average response rate is less than or equal to the preset response rate, skipping performing traffic limitation.

According to a second aspect, a system of limiting traffic is provided, including a distributed node and a central node, wherein the distributed node is configured to send a service volume in a current preset time period to the central node according to a fixed period;

the central node is configured to determine a decision quota of the distributed node based on the received service volume, and sending the decision quota to the distributed node; and the distributed node is configured to receive the decision quota sent by the central node, and after receiving an access request, determine, based on the latest received decision quota, whether traffic limitation needs to be performed for the access request.

Optionally, the service volume further includes a back-to-source volume; and correspondingly, the distributed node is configured to:

after receiving an access request, determine whether a back-to-source request needs to be sent to a source station; and if yes, determine, based on the latest received decision quota, whether traffic limitation needs to be performed for the access request.

Optionally, the service volume in the preset time period includes at least one of traffic generated by the distributed node in the preset time period, an average bandwidth in the preset time period, the number of connections established in the preset time period, and the number of access requests in the preset time period.

Optionally, the distributed node is configured to:

compare a current service increment with the latest received decision quota; and if the current service increment is less than the latest received decision quota, skip performing traffic limitation, or otherwise, perform traffic limitation on the access request.

Optionally, the distributed node is configured to:

determine a time interval between a current time and a time at which a service volume is sent to the central node last time;

if the time interval is less than a preset duration, perform traffic limitation for the access request; and if the time interval is greater than or equal to the preset duration, send the service volume in the current preset time period to the central node, receive a new decision quota sent by the central node, and then determine, based on the latest received decision quota, whether traffic limitation needs to be performed for the access request.

Optionally, the distributed node is configured to:

perform traffic limitation by rejecting the access request; or perform traffic limitation by limiting a response rate to the access request.

Optionally, the distributed node is configured to:

after determining that the current service increment is greater than or equal to the latest received decision quota, respond to the access request with a preset response rate; and receive a next access request, and reject the next access request if the current service increment is still greater than or equal to the latest received decision quota.

Optionally, the distributed node is configured to:

receive the next access request after responding to the access request at the preset response rate, and if the current service increment is less than the latest received decision quota and a current average response rate is greater than the preset response rate, respond to the next access request at the preset response rate, wherein the current average response rate is equal to a ratio of traffic generated in the current preset time period to the number of access requests in the current preset time period; and receive the next access request, and if the current service increment is less than the latest received decision quota and the current average response rate is less than or equal to the preset response rate, skip performing traffic limitation.

According to a third aspect, a node device is provided, including:

at least one processor; and a memory communicably connected with the at least one processor for storing instructions executable by the at least one processor, wherein execution of the instructions by the at least one processor causes the at least one processor to perform the processing process performed by the distributed node in the method of limiting traffic according to the first aspect described above.

According to a fourth aspect, a computer readable storage medium is provided, storing a computer program, wherein the computer program is executed by a processor to implement the processing process performed by the distributed node in the method of limiting traffic according to the first aspect described above.

In the embodiments of the present application, the traffic limitation decision is made by the distributed node autonomously, the decision path is short, and fast decision is achieved. In addition, according to the statistical principle, a corresponding decision quota can be allocated each distributed node according to the real-time service volume of each distributed node. That is, the larger the service volume is, the higher the allocated decision quota is. In this way, a distributed node in a heavy-traffic area can receive and respond to access requests to the greatest extent, thereby improving the utilization of resources. Moreover, the method of limiting traffic is more accurate and can improve the service performance of the distributed system.

BRIEF DESCRIPTION OF THE DRAWINGS

To describe the technical solutions of the embodiments of the present disclosure more clearly, the accompanying drawings required for illustrating the embodiments will be introduced briefly in the following. Apparently, the accompanying drawings in the following description are merely some embodiments of the present disclosure, and a person of ordinary skill in the art may obtain other accompanying drawings based on these accompanying drawings without creative efforts.

DETAILED DESCRIPTION

To make the objectives, technical solutions and advantages of the present disclosure clearer, the embodiments of the present disclosure are described in detail below with reference to the accompanying drawings.

Figure 1:
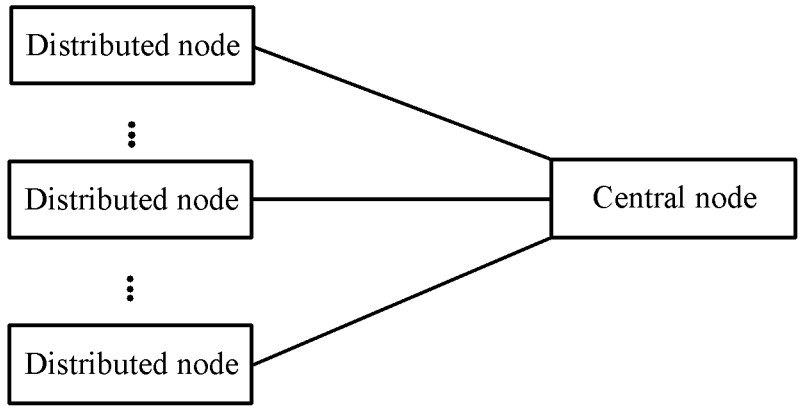
FIG. 1 is a schematic diagram of a network architecture according to an embodiment of the present application.

An embodiment of the present disclosure provides a method of limiting traffic. The method can be applied to a network framework shown in FIG. 1. The network framework includes a central node and a plurality of distributed nodes, and each distributed node is connected to the central node. In a Content Delivery Network (CDN) system, the distributed node is a CDN node. The distributed node is configured to receive an access request sent by a client and provide a service. In a scenario to which traffic limitation is applied, each distributed node first sends a service volume in a current preset time period to the central node according to a fixed period. The central node then determines a decision quota corresponding to each of the distributed nodes based on the service volumes sent by all the distributed nodes, and sends the corresponding decision quota to each of the distributed nodes. Each of the distributed nodes receives the decision quota, and after receiving an access request, determines, based on the latest received decision quota, whether traffic limitation needs to be performed for the access request. The traffic limitation decision is made by the distributed node autonomously, the decision path is short, and fast decision is achieved. In addition, according to the statistical principle, a corresponding decision quota can be allocated according to the real-time service volume of each distributed node. That is, the larger the service volume is, the higher the allocated decision quota is. In this way, a distributed node in a heavy-traffic area can receive and respond to access requests to the greatest extent, thereby improving the utilization of resources. Moreover, the method of limiting traffic is more accurate and can improve the service performance of the distributed system.

Figure 2:
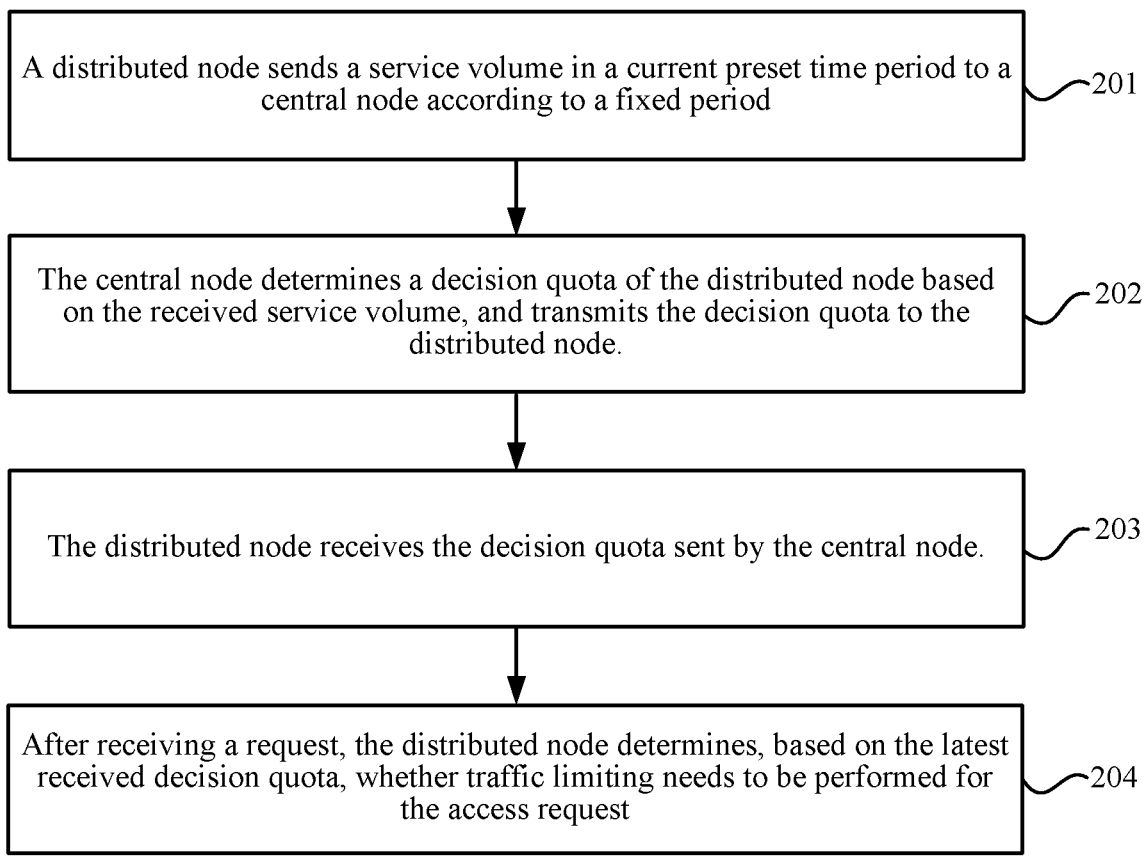
FIG. 2 is a flowchart of a method of limiting traffic according to an embodiment of the present application.

FIG. 2 is a flowchart of a method of limiting traffic according to an embodiment of the present application. Referring to FIG. 2, the method specifically includes following steps.

Step 201: A distributed node sends a service volume in a current preset time period to a central node according to a fixed period.

Each distributed node in a distributed system sends a service volume in a current preset time period to a central node according to a same fixed period. The fixed period may be set to any length, for example, one second or one minute. The service volume in the current preset time period may be a service volume within a period of time before the current time. For example, when the current time is t and the preset time period is 1 minute, the service volume in the current preset time period is a service volume during the period from t−1 to t.

In the CDN system, after a CDN node (distributed node) receives an access request sent by a client, if the content to be accessed is cached in the node, the cache is directly used to respond, that is, serve the access request. If the content to be accessed is not cached in the CDN node, or the cached content has expired, a back-to-source request is sent to a source station to request the content. Embodiments of the present disclosure may perform traffic limitation for the scenario of serving the access request, and may also perform traffic limitation for the back-to-source scenario, that is, restricting the CDN node from sending a back-to-source request to the source station. When traffic limitation is performed for the scenario of serving the access request, the service volume sent by the distributed node to the central node is a service volume generated in response to the access request. When traffic limitation is performed for the back-to-source scenario, the service volume sent by the distributed node to the central node is the service volume generated during the back-to-source process. That is to say, the service volume sent by the distributed node to the central node includes the service volume generated in response to the access request, or the service volume generated during the back-to-source process, that is, a back-to-source volume. Performing traffic limitation for the back-to-source scenario can prevent the source station from bearing excessive access load and ensure the stability of the source station.

The service volume may be expressed by traffic, bandwidth, the number of connections, or the number of access requests. Specifically, when the service volume sent by the distributed node to the central node is the service volume generated in response to the access request, the service volume in the preset time period includes one or more of traffic generated by the distributed node in the preset time period, an average bandwidth in the preset time period, the number of connections established in the preset time period, or the number of access requests in the preset time period. When the service volume is represented by the number of connections, the service volume in the preset time period is the number of connections established by the distributed node with the client within the preset time period. When the service volume is represented by the number of access requests, the service volume in the preset time period is the number of access requests of the distributed node in the preset time period, wherein the number of access requests in the preset time period may be the number of access requests that have been responded to, or the sum of the number of access requests that have been responded to and the number of access requests that are currently being responded to, or the sum of the number of access requests that have been responded to, the number of access requests that are currently being responded to, and the number of access requests that have not been responded to.

When the service volume sent by the distributed node to the central node is the back-to-source volume, the service volume in the preset time period includes one or more of the traffic generated by the distributed node in the preset time period (back-to-source traffic), and the average bandwidth (back-to-source bandwidth) in the preset time period or the number of connections established in the preset time period. The back-to-source traffic generated by the distributed node in the preset time period may be the amount of content obtained by the distributed node in the preset time period during the back-to-source process. When the service volume is represented by the number of connections, the service volume in the preset time period is the number of connections established by the distributed node with the source station within the preset time period.

Step 202: The central node determines a decision quota of the distributed node based on the received service volume, and sends the decision quota to the distributed node.

Each distributed node periodically sends the latest service volume to the central node. The central node calculates a traffic proportion of each distributed node according to the latest service volume, and then calculates a decision quota corresponding to each distributed node according to the traffic proportion of each distributed node. The larger the traffic proportion is, the higher the corresponding decision quota is, that is, more service access requests are allowed to be received. In this way, the decision quota of the distributed node can be adjusted in real time according to the real-time service volume of the distributed node, and according to the decision quota, it is determined whether traffic limitation needs to be performed, thereby ensuring the accuracy of traffic limitation, and improving the service performance of the entire distributed system.

An expression of the decision quota corresponding to the distributed node is:

$$ECLi=(LT-(EC1+EC2+\ldots+ECn))*ECPi, i=1,2\ldots n,$$

where ECLi represents the decision quota corresponding to the i-th distributed node, LT represents an overall upper limit, ECi represents the service volume corresponding to the i-th distributed node, ECPi represents the traffic proportion of the i-th distributed node, and ECPi=ECi/(EC1+ EC2+ . . . +ECn).

The overall upper limit is a value pre-stored in the central node, indicating total load allowed by the distributed system. In a specific embodiment, the overall upper limit may be an overall upper limit of the service volume generated for serving the access request or an overall upper limit for the back-to-source volume. When traffic limitation is performed for the scenario of serving the access request, the overall upper limit may be an overall upper limit of the service volume generated for serving the access request. When traffic limitation is performed for the back-to-source scenario, the overall upper limit is an overall upper limit for the back-to-source volume.

The overall upper limit is expressed in the same manner as the service volume reported by the distributed node to the central node. That is, if the service volume is expressed by traffic, the overall upper limit is also expressed by traffic; if the service volume is expressed by bandwidth, the overall upper limit is also expressed by bandwidth; if the service volume is expressed by the number of connections, the overall upper limit is also expressed by the number of connections; if the service volume is expressed by the number of access requests, the overall upper limit is also expressed by the number of access requests.

Step 203: The distributed node receives the decision quota sent by the central node.

Step 204: After receiving an access request, the distributed node determines whether traffic limitation needs to be performed for the access request.

When traffic limitation is performed for the scenario of serving the access request, the distributed node, each time receiving an access request, determines whether needs to be performed for the access request. When traffic limitation is performed for the back-to-source scenario, the distributed node, after receiving the access request, determines whether a back-to-source request needs to be sent to the source station; and if yes, determines, based on the latest received decision quota, whether traffic limitation needs to be performed for the access request. A specific process for the distributed node to determine, based on the latest received decision quota, whether traffic limitation needs to be performed for the access request is as follows: after receiving the access request, the distributed node compares a current service increment with the latest received decision quota, wherein the service increment is a difference between the service volume in the current preset time period and the service volume sent to the central node last time; and if the current service increment of the distributed node is less than the latest received decision quota, skips performing traffic limitation, or otherwise, performs traffic limitation for the access request.

In another embodiment, after determining that the current service increment is greater than or equal to the latest received decision quota, the distributed node determines a time interval between a current time and a time at which a service volume is sent to the central node last time; if the time interval is less than a preset duration, performs traffic limitation for the access request; and if the time interval is greater than or equal to the preset duration, sends the service volume in the current preset time period to the central node, receives a new decision quota sent by the central node, and then determines, based on the latest received decision quota, whether traffic limitation is needed to be performed for the access request.

The preset duration is shorter than the fixed period according to which the distributed node periodically reports the service volume to the central node. For example, the fixed period according to which the distributed node periodically reports the service volume to the central node is 1 minute, and the preset duration may be set to 30 s. After the distributed node receives the decision quota, the accuracy of the decision quota may decrease with time. Therefore, when a long time has elapsed after the decision quota is received, that is, when the time interval between the current time and the time at which the service volume is sent to the central node last time exceeds the preset duration, it indicates that a new decision quota needs to be obtained, in order to avoid the case that traffic limitation is incorrectly performed and affects the service quality because the decision quota is not updated in time.

In a specific embodiment, even if the time at which the service volume is to be reported to the central node is not reached, the central node recalculates the decision quota upon receiving a service volume sent by a distributed node, and delivers the new decision quota to the distributed node.

The following describes the method of limiting traffic of the distributed node by using the traffic limitation in the scenario of serving the access request as an example.

Assuming that the fixed period according to which the distributed node reports the service volume to the central node is 1 minute and the preset time period for collecting statistics on the service volume is 2 minutes, a traffic limitation response process is as follows:

(1) The distributed node sends a service volume ECi1 in the time period from t1-2 to t1 to the central node at time t1.

(2) The distributed node receives a decision quota ECLi1 sent by the central node.

(3) The distributed node receives an access request a at the time t2, calculates a current service increment Di1, and if the service increment Di1 is less than the decision quota ECLi1, skips performing traffic limitation, wherein Di1 is obtained by subtracting ECi1 from a service volume ECi2 obtained in a time period from t2-2 to t2.

(4) The distributed node receives a next access request b at time t3, calculates a current service increment Di2, and if the service increment Di2 is less than the decision quota ECLi1, skips performing traffic limitation, and the process ends; otherwise, determines a time interval between the current time and the time at which the service volume is sent to the central node last time, that is, the time interval between the current time and time t1, where Di2 is obtained by subtracting ECi1 from a service volume ECi3 in a time period from t3-2 to t3.

(5) If the time interval is greater than the preset duration, send the service volume ECi3 in the time period of t3-2 to t3 to the central node, and go to the next step; otherwise, perform traffic limitation for the access request b.

(6) The distributed node receives a decision quota ECLi3 sent by the central node.

(7) The distributed node compares the service increment Di2 with the decision quota ECLi3, and if the service increment Di2 is less than the decision quota ECLi3, skips performing traffic limitation, or otherwise, performs traffic limitation for the access request b.

When traffic limitation is performed for the back-to-source scenario, the traffic limitation may be performed by rejecting the access request, that is, no back-to-source request is sent to the source station. When the traffic limitation is performed for the scenario of serving the access request, the traffic limitation may be performed by rejecting the access request and/or limiting a response rate to the access request. A process of performing traffic limitation by rejecting the access request and limiting the response rate to the access request is as follows:

receiving, by the distributed node, a current access request, and after determining that the current service increment is greater than or equal to the latest received decision quota, responding to the access request with a preset response rate; and receiving, by the distributed node, a next access request; if the current service increment is still greater than or equal to the latest received decision quota, rejecting the next access request; if the current service increment is less than the latest received decision quota and a current average response rate is greater than the preset response rate, responding to the next access request at the preset response rate, wherein the current average response rate is equal to a ratio of traffic generated in the current preset time period to the number of access requests in the current preset time period; and if the current service increment is less than the latest received decision quota and the current average response rate is less than or equal to the preset response rate, skipping performing traffic limitation.

When no traffic limitation needs to be performed for the access request, the access request is processed at a default response rate. The preset response rate is less than the default response rate.

Figure 3:
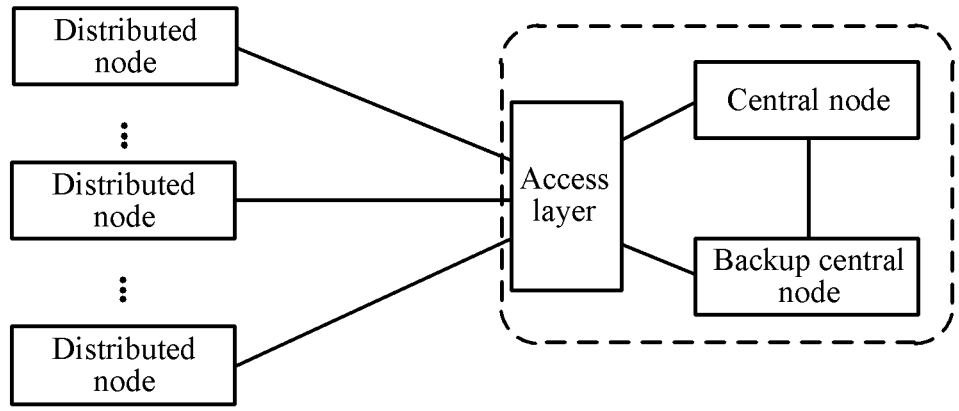
FIG. 3 is a schematic diagram of another network architecture according to an embodiment of the present application.
Figure 4:
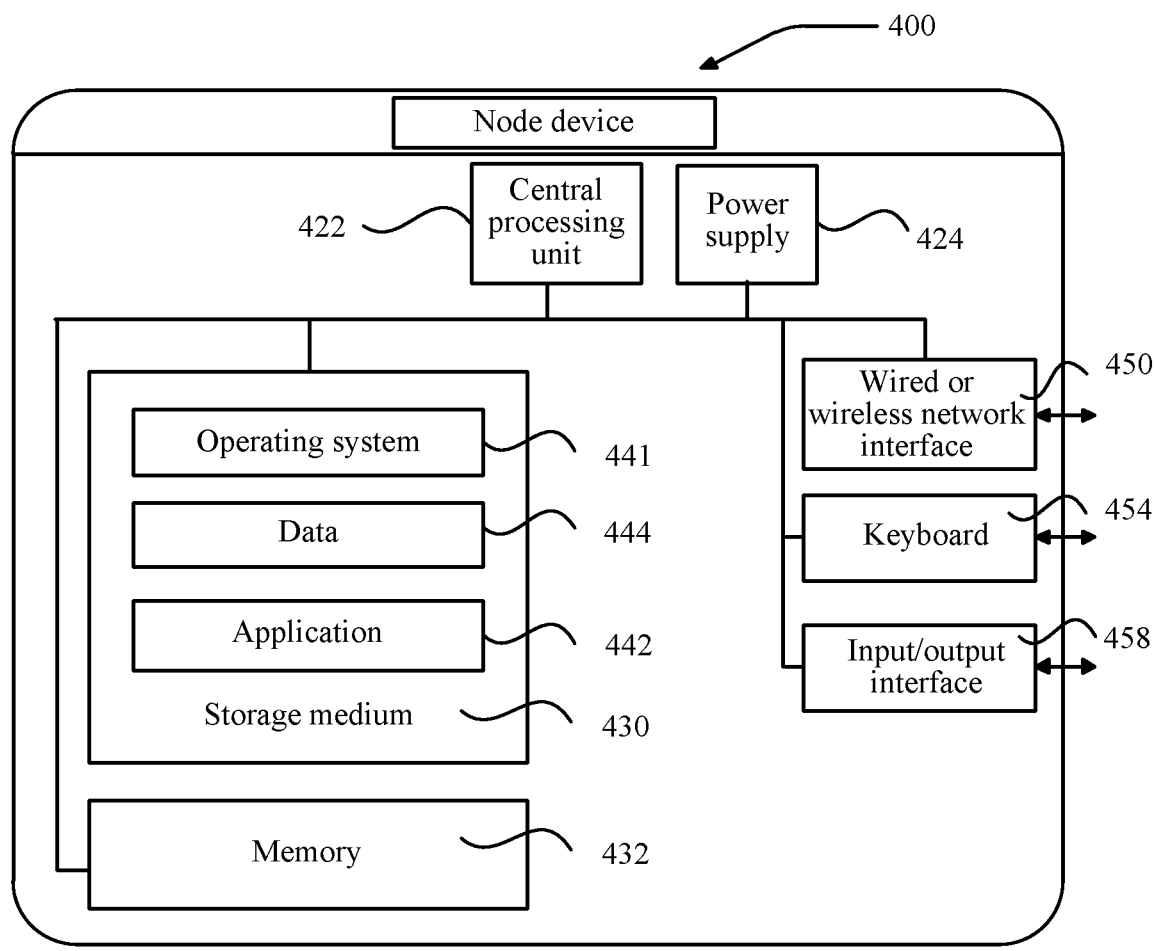
FIG. 4 is a structural block diagram of a node device according to an embodiment of the present application.

As shown in FIG. 3, a backup central node may further be disposed. The central node periodically synchronizes data to the backup central node. When the central node is faulty, the backup central node replaces the central node to provide services. Specifically, the central node and the backup central node are connected to a same access layer, and the access layer is connected to each of the distributed nodes. The access layer is configured to receive data sent by each of the distributed nodes, and guide the data to the central node or the backup central node. When the central node works normally, the access layer guides the received data to the central node. When the central node is faulty, the access layer guides the received data to the backup central node, thereby ensuring that the traffic limitation decision is normally made, and ensuring the service performance of the distributed system.

In this embodiment of the present application, the traffic limitation decision is made by the distributed node autonomously, the decision path is short, and fast decision is achieved. In addition, according to the statistical principle, a corresponding decision quota can be allocated each distributed node according to the real-time service volume of each distributed node. That is, the larger the service volume is, the higher the allocated decision quota is. In this way, a distributed node in a heavy-traffic area can receive and respond to access requests to the greatest extent, thereby improving the utilization of resources. Moreover, the method of limiting traffic is more accurate and can improve the service performance of the distributed system.

An embodiment of the present disclosure further provides a system of limiting traffic, including a distributed node and a central node, wherein the distributed node is configured to send a service volume in a current preset time period to the central node according to a fixed period;

the central node is configured to determine a decision quota of the distributed node based on the received service volume, and send the decision quota to the distributed node; and the distributed node is configured to receive the decision quota sent by the central node, and after receiving an access request, determine, based on the latest received decision quota, whether traffic limitation needs to be performed for the access request.

For example, the service volume further includes a back-to-source volume; and correspondingly, the distributed node is configured to:

after receiving an access request, determine whether a back-to-source request needs to be sent to a source station; and if yes, determine, based on the latest received decision quota, whether traffic limitation needs to be performed for the access request.

For example, the service volume in the preset time period includes one or more of traffic generated by the distributed node in the preset time period, an average bandwidth in the preset time period, the number of connections established in the preset time period, or the number of access requests in the preset time period.

For example, the distributed node is configured to:

compare a current service increment with the latest received decision quota; and if the current service increment is less than the latest received decision quota, skip performing traffic limitation, or otherwise, perform traffic limitation for the access request.

For example, the distributed node is configured to:

determine a time interval between a current time and a time at which a service volume is sent to the central node last time;

if the time interval is less than a preset duration, performing traffic limitation for the access request; and if the time interval is greater than or equal to the preset duration, send the service volume in the current preset time period to the central node, receive a new decision quota sent by the central node, and then determine, based on the latest received decision quota, whether traffic limitation needs to be performed for the access request.

For example, the distributed node is configured to:

perform traffic limitation by rejecting the access request; or perform traffic limitation by limiting a response rate to the access request.

For example, the distributed node is configured to:

after determining that the current service increment is greater than or equal to the latest received decision quota, respond to the access request with a preset response rate; and receive a next access request, and reject the next access request if the current service increment is still greater than or equal to the latest received decision quota.

For example, the distributed node is configured to:

receive the next access request after responding to the access request at the preset response rate, and if the current service increment is less than the latest received decision quota and a current average response rate is greater than the preset response rate, respond to the next access request at the preset response rate; wherein the current average response rate is equal to a ratio of traffic generated in the current preset time period to the number of access requests in the current preset time period; and receive the next access request, and if the current service increment is less than the latest received decision quota and the current average response rate is less than or equal to the preset response rate, skip performing traffic limitation.

In this embodiment of the present disclosure, the traffic limitation decision is made by the distributed node autonomously, the decision path is short, and fast decision is achieved. In addition, according to the statistical principle, a corresponding decision quota can be allocated each distributed node according to the real-time service volume of each distributed node. That is, the larger the service volume is, the higher the allocated decision quota is. In this way, a distributed node in a heavy-traffic area can receive and respond to access requests to the greatest extent, thereby improving the utilization of resources. Moreover, the method of limiting traffic is more accurate and can improve the service performance of the distributed system.

It should be noted that, the system of limiting traffic provided by this embodiment and the embodiment of the method of limiting traffic belong to the same concept. A specific implementation process of the system of limiting traffic may refer to the method embodiments for details, and details are not described herein again.

FIG. 3 is a schematic structural diagram of a node device according to an embodiment of the present disclosure. The node device 400 may vary greatly due to different configurations or performance, and may include one or more central processing units (CPU) 422 (for example, one or more processors) and memories 432, and one or more storage media 430 (for example, one or more mass storage devices) storing an application program 442 or data 444. The memory 432 and the storage medium 430 may be temporary or permanent storages. The program stored in the storage medium 430 may include one or more modules (not shown), and each module may include a series of instructions and operations for the node device. Further, the central processing unit 422 may be configured to communicate with the storage medium 430, and execute, on the node device 400, a series of instructions and operations in the storage medium 430.

The node device 400 may further include one or more power supplies 424, one or more wired or wireless network interfaces 450, one or more input/output interfaces 458, one or more keyboards 454, and/or one or more operating systems 441, for example, Windows Server, Mac OS X, Unix™, Linux, or FreeBSD.

The node device 400 may include a memory and at least one program, wherein the at least one program is stored in the memory, and is configured, to cause the at least one processor execute the at least one program, including instructions for performing the method of limiting traffic:

sending a service volume in a current preset time period to a central node according to a fixed period;

receiving a decision quota sent by the central node;

determining, based on the latest received decision quota after receiving an access request, whether traffic limitation needs to be performed for the access request.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method of limiting traffic, comprising:
sending, by a distributed node, a service volume in a current preset time period to a central node according to a fixed period, wherein the service volume in the current preset time period is a service volume within a period of time before a current time;
performing, by the central node, calculation to determine a traffic proportion of the distributed node according to the service volume, performing calculation to determine a decision quota for the distributed node based on the traffic proportion, and sending the decision quota to the distributed node, wherein the decision quota has a positive correlation with the traffic proportion;
receiving, by the distributed node, the decision quota sent by the central node; and
determining, by the distributed node based on the latest received decision quota after receiving an access request, whether traffic limitation needs to be performed for the access request.

2. The method according to claim 1, wherein the service volume further comprises a back-to-source volume; and
correspondingly, the step of determining, by the distributed node based on the latest received decision quota after receiving the access request, whether traffic limitation needs to be performed for the access request comprises:
after receiving the access request, determining, by the distributed node, whether a back-to-source request needs to be sent to a source station; and
if yes, determining, based on the latest received decision quota, whether traffic limitation needs to be performed for the access request.

3. The method according to claim 2, wherein the service volume in the preset time period comprises at least one of traffic generated by the distributed node in the preset time period, an average bandwidth in the preset time period, the number of connections established in the preset time period, and the number of access requests in the preset time period.

4. The method according to claim 1, wherein the service volume in the preset time period comprises at least one of traffic generated by the distributed node in the preset time period, an average bandwidth in the preset time period, the number of connections established in the preset time period, and the number of access requests in the preset time period.

5. The method according to claim 1, wherein the step of determining, by the distributed node based on the latest received decision quota, whether traffic limitation needs to be performed for the access request comprises:
comparing, by the distributed node, a current service increment with the latest received decision quota; and
if the current service increment of the distributed node is less than the latest received decision quota, skipping performing traffic limitation, or otherwise, performing traffic limitation for the access request.

6. The method according to claim 5, wherein after the determining, by the distributed node, that the current service increment is greater than or equal to the latest received decision quota, the method further comprises:

determining a time interval between a current time and a time at which a service volume is sent to the central node last time;

if the time interval is less than a preset duration, performing traffic limitation for the access request; and if the time interval is greater than or equal to the preset duration, sending the service volume in the current preset time period to the central node, receiving a new decision quota sent by the central node, and then determining, based on the latest received decision quota, whether traffic limitation needs to be performed for the access request.

7. The method according to claim 6, wherein the step of performing, by the distributed node, traffic limitation for the access request comprises:

rejecting, by the distributed node, the access request; or limiting, by the distributed node, a response rate to the access request.

8. The method according to claim 5, wherein the step of performing, by the distributed node, traffic limitation for the access request comprises:

rejecting, by the distributed node, the access request; or limiting, by the distributed node, a response rate to the access request.

9. The method according to claim 5, wherein after the determining, by the distributed node, that the current service increment is greater than or equal to the latest received decision quota, the method further comprises:

responding, by the distributed node, to the access request with a preset response rate; and receiving, by the distributed node, a next access request, and rejecting the next access request if the current service increment is still greater than or equal to the latest received decision quota.

10. The method according to claim 9, wherein after the responding, by the distributed node, to the access request with a preset response rate, the method further comprises:

receiving, by the distributed node, the next access request, and if the current service increment is less than the latest received decision quota and a current average response rate is greater than the preset response rate, responding to the next access request at the preset response rate, wherein the current average response rate is equal to a ratio of traffic generated in the current preset time period to the number of access requests in the current preset time period; and receiving, by the distributed node, the next access request, and if the current service increment is less than the latest received decision quota, and the current average response rate is less than or equal to the preset response rate, skipping performing traffic limitation.

11. A system of limiting traffic, comprising a distributed node and a central node, wherein the distributed node is configured to send a service volume in a current preset time period to the central node according to a fixed period, wherein the service volume in the current preset time period is a service volume within a period of time before a current time;

the central node is configured to perform calculation to determine a decision quota for the distributed node based on thee traffic proportion, and send the decision quota to the distributed node, wherein the decision quota has a positive correlation with the traffic proportion; and the distributed node is configured to receive the decision quota sent by the central node, and after receiving an access request, determine, based on the latest received decision quota, whether traffic limitation needs to be performed for the access request.

12. The system according to claim 11, wherein the service volume in the preset time period comprises at least one of traffic generated by the distributed node in the preset time period, an average bandwidth in the preset time period, the number of connections established in the preset time period, the number of access requests in the preset time period.

13. A node device, comprising:

at least one processor; and a memory communicably connected with the at least one processor for storing instructions executable by the at least one processor, wherein execution of the instructions by the at least one processor causes the at least one processor to perform the processing process performed by the distributed node in a method of limiting traffic, comprising:

sending, by a distributed node, a service volume in a current preset time period to a central node according to a fixed period, wherein the service volume in the current preset time period is a service volume within a period of time before a current time;

performing, by the central node, calculation to determine a traffic proportion of the distributed node according to the service volume, performing calculation to determine a decision quota for the distributed node based on the traffic proportion, and sending the decision quota to the distributed node, wherein the decision quota has a positive correlation with the traffic proportion;

receiving, by the distributed node, the decision quota sent by the central node;

determining, by the distributed node based on the latest received decision quota after receiving an access request, whether traffic limitation needs to be performed for the access request.

14. The node device according to claim 13, wherein the service volume further comprises a back-to-source volume; and correspondingly, the step of determining, by the distributed node based on the latest received decision quota after receiving the access request, whether traffic limitation needs to be performed for the access request comprises:

after receiving the access request, determining, by the distributed node, whether a back-to-source request needs to be sent to a source station; and if yes, determining, based on the latest received decision quota, whether traffic limitation needs to be performed for the access request.

15. The node device according to claim 13, wherein the service volume in the preset time period comprises at least one of traffic generated by the distributed node in the preset time period, an average bandwidth in the preset time period, the number of connections established in the preset time period, and the number of access requests in the preset time period.

16. The node device according to claim 13, wherein the step of determining, by the distributed node based on the latest received decision quota, whether traffic limitation needs to be performed for the access request comprises:

comparing, by the distributed node, a current service increment with the latest received decision quota; and if the current service increment of the distributed node is less than the latest received decision quota, skipping performing traffic limitation, or otherwise, performing traffic limitation for the access request.

17. The node device according to claim 16, wherein after the determining, by the distributed node, that the current service increment is greater than or equal to the latest received decision quota, the method further comprises:
  determining a time interval between a current time and a time at which a service volume is sent to the central node last time;
  if the time interval is less than a preset duration, performing traffic limitation for the access request; and
  if the time interval is greater than or equal to the preset duration, sending the service volume in the current preset time period to the central node, receiving a new decision quota sent by the central node, and then determining, based on the latest received decision quota, whether traffic limitation needs to be performed for the access request.

18. The node device according to claim 16, wherein the step of performing, by the distributed node, traffic limitation for the access request comprises:
  rejecting, by the distributed node, the access request; or
  limiting, by the distributed node, a response rate to the access request.

19. The node device according to claim 16, wherein after the determining, by the distributed node, that the current service increment is greater than or equal to the latest received decision quota, the method further comprises:
  responding, by the distributed node, to the access request with a preset response rate; and
  receiving, by the distributed node, a next access request, and rejecting the next access request if the current service increment is still greater than or equal to the latest received decision quota.

20. The node device according to claim 19, wherein after the responding, by the distributed node, to the access request with a preset response rate, the method further comprises:
  receiving, by the distributed node, the next access request, and if the current service increment is less than the latest received decision quota and a current average response rate is greater than the preset response rate, responding to the next access request at the preset response rate, wherein the current average response rate is equal to a ratio of traffic generated in the current preset time period to the number of access requests in the current preset time period; and
  receiving, by the distributed node, the next access request, and if the current service increment is less than the latest received decision quota and the current average response rate is less than or equal to the preset response rate, skipping performing traffic limitation.

* * * * *